Jan. 5, 1971  H. LINDE  3,552,827
DEVICE FOR OPTICAL SELECTION OF IMAGE AREAS
Filed July 12, 1967  4 Sheets-Sheet 3

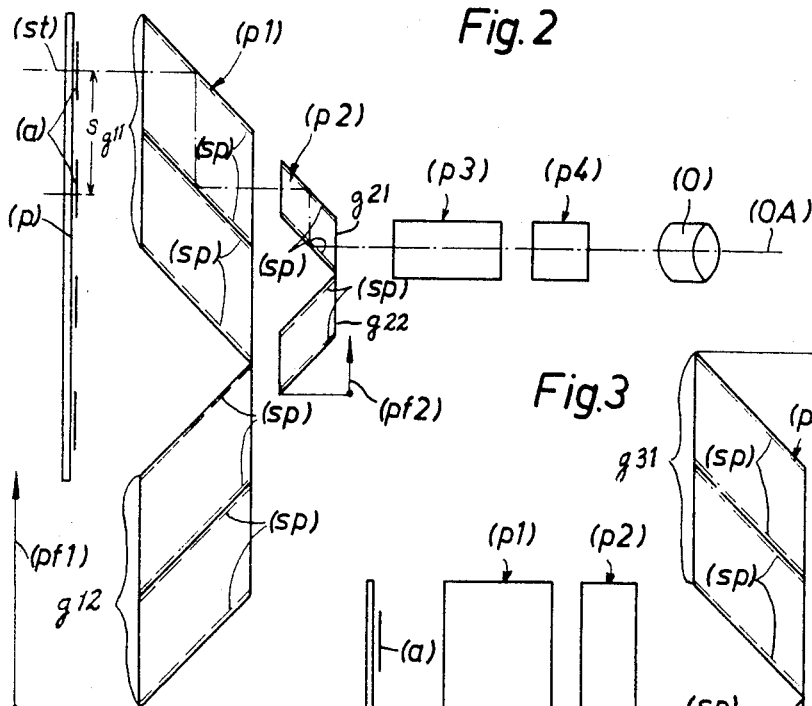
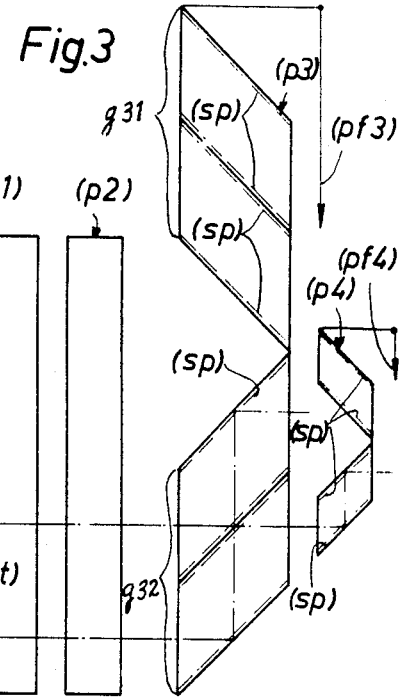
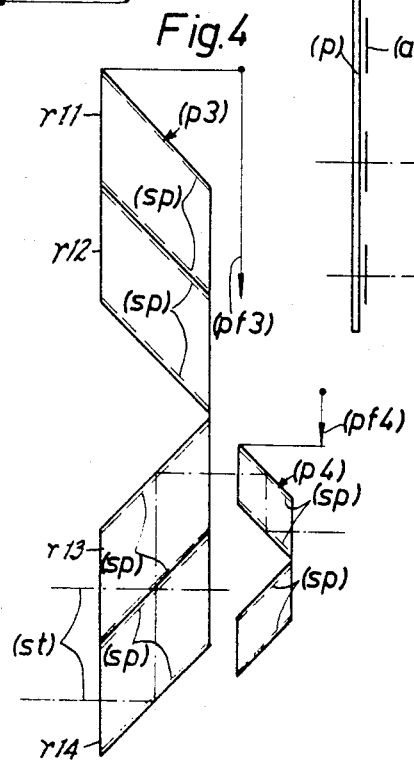

HANS LINDE
Inventor:

Attorney

HANS LINDE
Inventor:

Attorney

United States Patent Office 3,552,827
Patented Jan. 5, 1971

3,552,827
DEVICE FOR OPTICAL SELECTION OF IMAGE AREAS
Hans Linde, Berlin, Germany, assignor to H. Berthold Messsinglinienfabrik und Schriftgiesserei A.G., Berlin, Germany, a German company
Filed July 12, 1967, Ser. No. 652,807
Int. Cl. G02b 27/14
U.S. Cl. 350—171                                   9 Claims

ABSTRACT OF THE DISCLOSURE

A planar array of image areas is scanned by an optical selector comprising a series of reflector stages, the reflectors of each stage being a set of parallelogrammatic prisms with internal reflecting surfaces designed to shift an incoming beam parallel to itself in a predetermined direction of displacement in which the entire stage is selectively shiftable to channel light from different image areas to the similarly shiftable deflectors of the next-following stage. The number of prisms decreases progressively from one stage to the next, the prisms of each stage except the last being divided into two groups which are alternatively made effective upon their displacement in the beam-shifting direction.

---

The present invention has as its object a device for optical selection of image areas situated in a plane and preferably on a plate, for the purpose of examination or projection at a predetermined image-egress point.

It is already known that deflecting prisms may be incorporated in photographic composing machines for selecting and depicting individual characters of a stationary illuminated composing plate on a film. These prisms have the disadvantage that they are suitable for monochromatic light only, since deflecting prisms cause dispersion of light. Owing to the circumstance that the beam of light is deflected and not restored to parallelism with the optical axis, the image does not extend at right angles to the optical axis and is thus distorted. The externally situated characters are reduced in size, moreover, owing to oblique projection according to the known system. The photographic operation is conventionally designed to be triggered before the prisms come to rest in their final so-called "justified" position, which equally results in image distortions.

The invention is based on the problem of projecting the optionally selectable image areas situated in a plane at a predetermined image-egress point by means of relatively simple devices, in such a manner as to eliminate the cited shortcomings of the prior art and so that the trajectory of the light is not lengthened or shortened on transferring from one such image area to another.

According to the present invention, image areas are caused to undergo a parallel shift by displacement of reflecting prisms preferably having two parallel reflecting surfaces and vertical entry and exit areas, mirrors or analogous optical devices, another part of the image areas concomitantly being optically selected in each instance in a specific correlatively matched direction and being ducted to the image-egress point in such a manner that a single predetermined area only of the plane or, preferably, the plate carrying the said image areas issues from the final displaceable prism or the like. In a system according to the invention, optional selection of an image area and conditional transpositioning of the selection elements does not cause any change in light trajectory and no distortion of the image, therefore, even if the prisms do not reach their final position or are still in motion.

According to the invention, the optical selection elements may be so arranged that selection of the individual image areas occurs according to a binary code, so that each setting element has only two possible positions and thus corresponds to a binary digit. According to the invention, moreover, optically stored code values may be scanned photo-electronically with appropriately formed image areas, by setting of the optical selection elements according to the address code.

Figure 1:
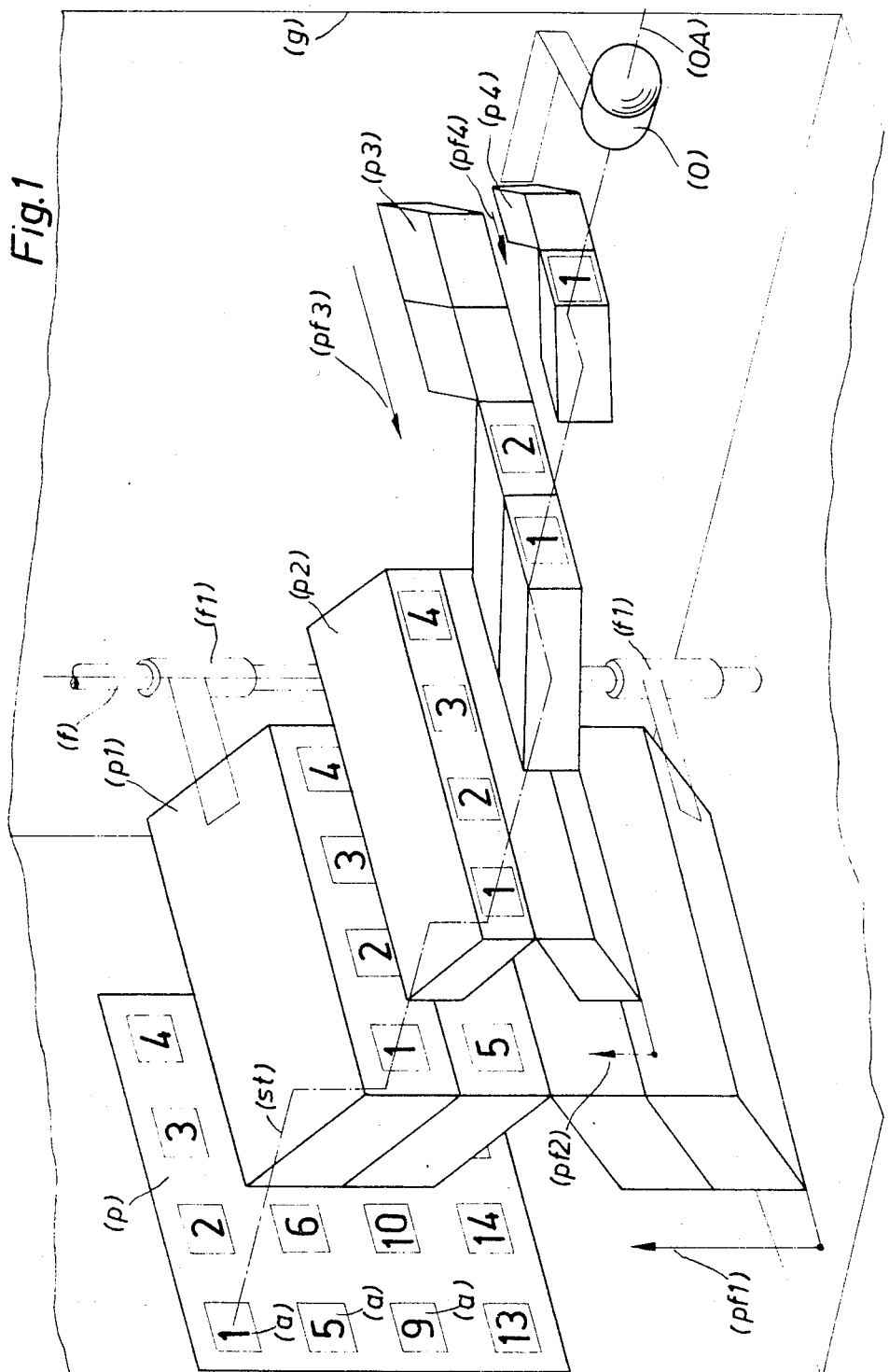
Figure 5:
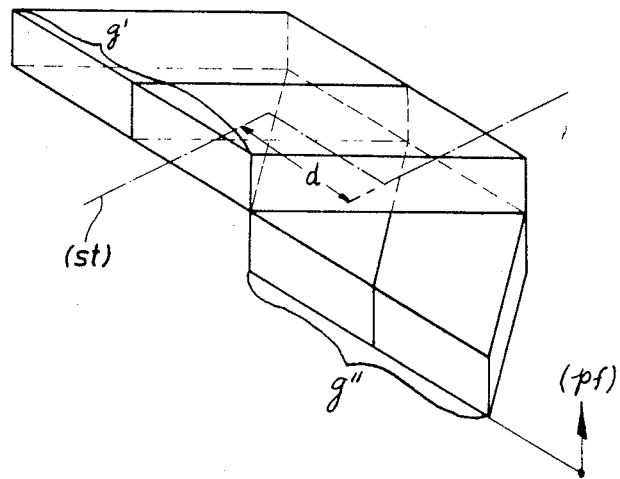
Figure 6:
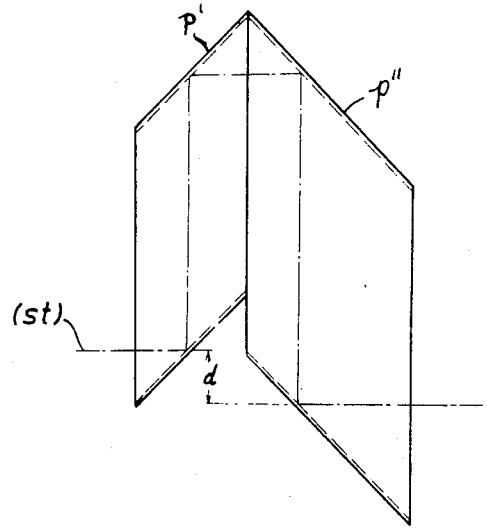
Figure 7:
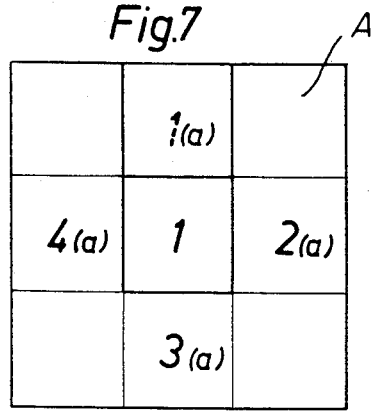
Figure 8:
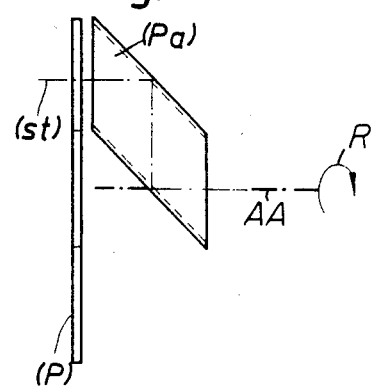
Figure 9:
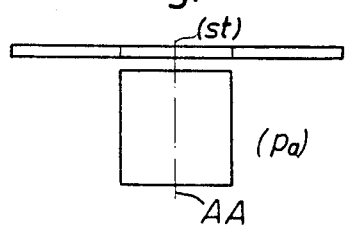
Figure 10:
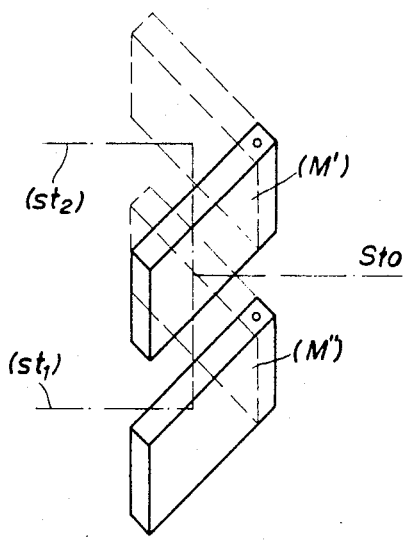

The invention will now be described in greater detail with reference to the accompanying drawing in which:

FIG. 1 is a perspective view of a device according to the invention;
FIG. 2 is a side view of the device shown in FIG. 1;
FIG. 3 shows a corresponding plan view;
FIG. 4 shows a part of the same plan view with another setting of the set of prisms;
FIG. 5 shows another embodiment using subdivided prisms displaceable transversely to the reflecting surfaces;
FIG. 6 shows a further modification being a prism arrangement designed to equalize a longer light path;
FIG. 7 shows a front view of a modification, comprising four prisms turned through 90° in each instance;
FIG. 8 shows a corresponding side view;
FIG. 9 is a corresponding plan view; and
FIG. 10 shows an embodiment, comprising deflecting mirrors.

A plate $p$ illuminated reflectively or otherwise, has areas ($a$) which are numbered from 1 to 16 in the system of FIGS. 1–3; from 1 to 4 in that of FIGS. 7–9. In front of the plate $p$, according to FIGS. 1 to 3, several sets of prisms $p1$, $p2$, $p3$ and $p4$ are positioned in such a way that each set of prisms can assumes two possible positions. A guiding system $f$ comprising transmission means $f1$ indicated merely diagrammatically, is employed for displacing the first set of prisms $p1$. The guiding device $f$ is mounted in the housing receiving the components of the system. The direction of motion of the sets of prisms is shown by corresponding arrows $pf1$, $pf2$, $pf3$ and $pf4$. A receiver for the selected image has been symbolized by an objective O centered on an optical axis OA.

In one position of the set of prisms $p1$, half the number of the areas ($a$) of the plate $p$, or of similar optionally picked up by the preceding effective set of prisms $p1$, $p2$, $p3$, are displaced parallel to themselves by reflection at reflecting surfaces $sp$ (FIGS. 2 and 3) relative to the optical axis $o$–$a$ of a projection lens $o$. In the second of the two possible positions of the set of prisms $p1$, the other half of the number of areas ($a$) become optically effective. Owing to the halving the number of areas ($a$) at each stage, a single area only emerges from the final set of prisms $p4$.

The path of light $st$ for the selected area 1 is illustrated in FIGS. 1 to 3. FIG. 4 shows the set of prisms $p4$ displaced in such a manner that the path of light corresponding to the area 2 emerges from the device.

It will thus be seen that, in the system particularly disclosed in FIGS. 1–4, the selector according to my invention has four cascaded light-guiding stages $p1$–$p4$ each with a set of parallelogrammatic prisms whose number decreases progressively, by a factor of two, from one stage to the next. These prisms, whose entry and exit faces are perpendicular to the path of an inicident beam ($st$) so as not to introduce any chromatic dispersion, have internal reflecting surfaces ($sp$) which shift the beam parallel to itself to an extent equal, in the first and third stages $p1$ and $p3$, to the center-to-center spacing $s$ (FIG. 2) of the areas ($a$) of the original array $p$, this being also the spacing of the output ends of the prisms of these first and third stages. The prisms of stage $p1$ are arranged in four rows $r11$, $r12$, $r13$, $r14$ which are transverse to the direction of displacement ($pf1$) and, therefore, also to the direction of beam shift introduced by the reflectors of this stage. The prisms of the second stage (p2) form two rows parallel to those of stage p1 and also transverse to the shift direction (pf2) of the second stage. The prisms of the two final stages p3 and p4 form single rows, also parallel to those of the preceding stages, but the shift direction of these stages (represented by arrows pf3 and pf4) is parallel to these rows.

Furthermore, the reflectors of each stage except the last one are divided into two groups, i.e. a group g11 (rows r11 and r12) and a group g12 (rows r13 and r14) in stage p1, a group g21 and a group g22 in stage p2, and a pair of groups g31, g32 each formed by half the reflectors of stage p3. The separation of the input ends of the two groups of any stage is substantially larger than the spacing of their input ends to enable alignment of these two sets of input ends with different incoming beams upon a shifting of the stage, i.e. (in the case of the first stage) with areas No. 1–8 in the position of FIG. 2 and with areas Nos. 9–16 in positions of FIG. 4.

The following prism positions are necessary for selection of the area 6:

Set of prisms p1—basic position with selection of the areas Nos. 1 to 8,

Set of prisms p2—displaced position in the direction of the arrow pf2 with selection of the areas Nos. 5 to 8 from the group of areas 1 to 8, Set of prisms p3—basic position with selection of the areas Nos. 5 and 6 from the group of areas 5 to 8, Set of prisms p4—displaced position in the direction of the arrow pf4 with selection of the area No. 6 from the group of areas 5 and 6.

In order to select the area 15, for example, the following displacements are necessary:

Set of prisms p1—displaced position pf1, group of areas 9 to 16,

Set of prisms p2—displaced position pf2, group of areas 13 to 16,

Set of prisms p3—displaced position pf3, group of areas 15 and 16,

Set of prisms p4—basic position, area 15.

Since each set of prisms p1 to p4 has two possible positions, the device according to the invention is particularly appropriate in apparatus controlled purely by means of a binary code and may equally be applied, e.g. by means of appropriate data in the areas (a), for scanning optically stored assigned code values.

In FIG. 5 I have shown two groups of reflectors g', g'', each consisting of two laterally juxtaposed prisms, which are displaceable in the direction of arrows pf at right angles to the direction d of beam shift introduced by any of these prisms.

FIG. 6 illustrates a composite reflector comprising a first parallelogrammatic or rhomboidal prism p' and a second parallelogrammatic prism p'' together jointly serving to shift an incident beam (st) parallel to itself by the desired distance d.

According to FIGS. 7–9, a modified array A on a plate P has four image areas 1(a), 2(a), 3(a), 4(a) clustered around a central area 1. A prismatic reflector Pa, rotatable about the array axis AA as indicated by an arrow R, can pick up a light beam (st) from any of these peripheral areas for selectively making the image thereof appear in a central position aligned with area 1.

FIG. 10 shows an adjustable reflector consisting of a pair of mirrors M', M'' which are jointly swingable between a first position (full lines) and a second position (dotted lines) to shift either of two incoming beams $st_1$ and $st_2$ onto a common outgoing beam path $st_0$.

I claim:

1. An optical selector juxtaposable with a planar array of image areas for optionally channeling light rays from any single area toward a receiver therefor, comprising several cascaded light-guiding stages each having a plurality of relatively fixed reflectors for shifting respective beams of incident light parallel to themselves, the reflectors of each stage being provided with inputs alternately positionable in the paths of different parallel incoming beams while directing said parallel beams upon a number of invariable outgoing paths, the number of said reflectors and the number of said outgoing paths decreasing progressively from one stage to the next, and control means selectively operable for jointly displacing the reflectors of any stage between several operating positions to provide a guide path through all said stages for light from a selected area to said receiver.

2. A selector as defined in claim 1 wherein the reflectors of at least one stage are divided into two sets with relatively closely spaced output ends and relatively widely spaced input ends, the separation of said output ends in a direction of displacement perpendicular to the beam direction being sufficient to align the input ends of one group with one set of incoming beams in a first operating position and to align the input ends of the other group with another set of incoming beams in a second operating position, the direction of beam shift in said stage being parallel to said direction of displacement.

3. A selector as defined in claim 2 wherein the reflectors of said groups have reflecting surfaces oppositely inclined with reference to the beam direction.

4. A selector as defined in claim 3 wherein the spacing of said output ends corresponds to the extent of the beam shift introduced by the reflectors of said one stage.

5. A selector as defined in claim 3 wherein the selectors of all stages are arranged in parallel rows transverse to the direction of displacement of the first stage.

6. A selector as defined in claim 5 wherein the selectors of said first stage form two rows in each group whose input ends are selectively alignable, upon a shifting thereof in said direction of displacement, with respective pairs of rows of image areas in said array.

7. A selector as defined in claim 5 wherein the direction of displacement of a further stage is parallel to said rows, all the selectors of said further stage being arranged in a single row.

8. A selector as defined in claim 1 wherein said selectors are parallelogrammatic prisms with internal reflecting surfaces inclined to the path of an incident beam and with entry and exit faces perpendicular to said path.

9. A selector as defined in claim 1 wherein the number of said reflectors decreases from stage to stage by a factor of two.

References Cited

UNITED STATES PATENTS 3,146,367  8/1964  McNaney __ 350—321(OSR)UX
3,343,451  9/1967  Durocher __ 350—321(OSR)UX JOHN K. CORBIN, Primary Examiner U.S. Cl. X.R.

350—286, 287